United States Patent
Sohn et al.

(10) Patent No.: US 12,463,804 B2
(45) Date of Patent: Nov. 4, 2025

(54) QUANTUM KEY DISTRIBUTION-BASED QUANTUM DIGITAL SIGNATURE METHOD AND SYSTEM INCLUDING TRUSTED NODE

(71) Applicant: KOREA INSTITUTE OF SCIENCE & TECHNOLOGY INFORMATION, Daejeon (KR)

(72) Inventors: Il Kwon Sohn, Daejeon (KR); Kwang Il Bae, Daejeon (KR); Eun Joo Lee, Daejeon (KR); Won Hyuk Lee, Sejong-si (KR)

(73) Assignee: KOREA INSTITUTE OF SCIENCE & TECHNOLOGY INFORMATION, Daejeon (KR)

( * ) Notice: Subject to any disclaimer, the term of this patent is extended or adjusted under 35 U.S.C. 154(b) by 233 days.

(21) Appl. No.: 18/338,179

(22) Filed: Jun. 20, 2023

(65) Prior Publication Data
US 2024/0235825 A1    Jul. 11, 2024

(30) Foreign Application Priority Data
Jan. 10, 2023    (KR) .................. 10-2023-0003408

(51) Int. Cl.
H04L 9/08    (2006.01)
H04L 9/14    (2006.01)
H04L 9/32    (2006.01)

(52) U.S. Cl.
CPC .......... H04L 9/0852 (2013.01); H04L 9/0819 (2013.01); H04L 9/14 (2013.01); H04L 9/3247 (2013.01)

(58) Field of Classification Search
CPC ..... H04L 9/3247; H04L 9/0852; H04L 9/085; H04L 9/14; H04L 9/0819
See application file for complete search history.

(56) References Cited

U.S. PATENT DOCUMENTS 11,356,247 B1 *  6/2022  Carter, Jr. ............. H04L 9/0656
2002/0199108 A1 * 12/2002  Chuang ................. H04L 9/0852
                                                    713/176

(Continued)

FOREIGN PATENT DOCUMENTS

KR    10-2020-0022594 A    3/2020

OTHER PUBLICATIONS

K. Longmate et al., "Signing information in the quantum era," AVS Quantum Science 2, Nov. 10, 2020, pp. 044101-1 to 044101-27.

(Continued)

Primary Examiner — Mohammad A Siddiqi
(74) Attorney, Agent, or Firm — Studebaker Brackett PLLC

(57) ABSTRACT

The present disclosure according to at least one embodiment provides a quantum key distribution (QKD)-based quantum digital signature method using a trusted node, the QKD-based quantum digital signature method being performed by a trusted node. The method comprises sharing a first secret key with a message-sending node, sharing a second secret key with a message-receiving node, generating a first trusted-node signature by performing a partial QKD process together with the message-sending node, generating a second trusted-node signature by performing a partial QKD process together with the message-receiving node, and verifying a first message with the shared first and second secret keys and with the first and second trusted-node signatures.

19 Claims, 13 Drawing Sheets

(56) References Cited

U.S. PATENT DOCUMENTS

| | | | |
|---|---|---|---|
| 2009/0175452 A1* | 7/2009 | Gelfond | H04L 9/0855 380/256 |
| 2011/0051989 A1* | 3/2011 | Gao | H04N 1/32144 382/100 |
| 2013/0083926 A1* | 4/2013 | Hughes | H04L 9/3247 380/278 |
| 2017/0244067 A1* | 8/2017 | Sano | H10K 59/131 |
| 2020/0260756 A1* | 8/2020 | Crundwell | A23G 9/22 |
| 2020/0351262 A1* | 11/2020 | McConnell | G06Q 20/352 |
| 2021/0226800 A1* | 7/2021 | Cao | H04L 9/0637 |
| 2022/0006615 A1* | 1/2022 | Wright | H04L 9/085 |
| 2022/0393858 A1* | 12/2022 | Barger | H04L 9/50 |
| 2023/0375327 A1* | 11/2023 | Vacon | G01B 9/02001 |
| 2025/0080338 A1* | 3/2025 | Riedinger | H04L 9/0838 |

OTHER PUBLICATIONS

An Office Action; "Notice of Reasons for Refusal," mailed by the Japanese Patent Office on Jul. 16, 2024, which corresponds to Japanese Patent Application No. 2023-100525 and is related to U.S. Appl. No. 18/338,179.

Robert J. Collins et al., "Experimental transmission of quantum digital signatures over 90 km of installed optical fiber using a differential phase shift quantum key distribution system"; Optics Letter; vol. 41, No. 21; Nov. 1, 2016; Optical Society of America; pp. 4883-4886.

Changho Hong et al., "Quantum digital signature in a network"; Quantum Information Processing; vol. 19, No. 18; Nov. 26, 2019; Springer Nature; pp. 1-21.

* cited by examiner

US 12,463,804 B2

QUANTUM KEY DISTRIBUTION-BASED QUANTUM DIGITAL SIGNATURE METHOD AND SYSTEM INCLUDING TRUSTED NODE

CROSS-REFERENCE TO RELATED APPLICATION

This application claims priority from Korean Patent Application No. 10-2023-0003408 filed on Jan. 10, 2023, in the Korean Intellectual Property Office, and all the benefits accruing therefrom under 35 U.S.C. 119, the contents of which in its entirety are herein incorporated by reference.

BACKGROUND

1. Field

The present disclosure relates to a tripartite quantum key distribution (QKD)-based digital signature method and system using a trusted center.

2. Description of the Related Art

A quantum digital signature technology is a technology in which the sender and the receiver of a message distribute signatures using the principles of quantum physics for secure transmission of information to verify the identity of the sender for secure information transmission.

There are two conventional quantum digital signature methods, i.e., a quantum key distribution (QKD)-based quantum digital signature method and a quantum digital signature method using trusted center-based quantum entanglement.

The QKD-based quantum digital signature method may use existing QKD equipment, but requires direct communication between a node receiving and verifying messages and a node additionally verifying the messages. Under normal circumstances, a network may logically be in a full-mesh form, but may actually have various shapes such as a tree shape or a ring shape. Thus, as direct communication between particular nodes involves passing through upper nodes or neighboring nodes, problems such as eavesdropping and tampering may arise.

FIG. 1 illustrates a conventional QKD-based quantum digital signature method.

Referring to FIG. 1, a QKD-based quantum digital signature system 60 may include a receiver 61 (referred to as Alice 61), a first sender 62 (referred to as Bob 62), and a second sender 63 (referred to as Charlie 63).

Alice 61 and Bob 62 may generate signatures by conducting a partial QKD procedure (without post processes such as reconciliation and privacy amplification) to generate imperfect encryption keys, and Alice 61 and Charlie 63 may generate signatures by conducting the partial QKD procedure to generate imperfect encryption keys.

Thereafter, Alice 61 may send a message and a signature to Bob 62, and Bob 62 may compare his key and the signature and record the number of mismatches between his key and the signature. If the number of mismatches between his key and the signature is less than a threshold value, Bob 62 accepts the message, and delivers the message to Charlie 63. On the contrary, if the number of mismatches between his key and the signature is not less than the threshold value, Bob 62 rejects the message and stops the corresponding protocol. Charlie 63 may check the message in the same manner as Bob 62. Charlie 63 may accept the message if the number of mismatches between his key and the signature is less than a threshold value. Here, Charlie 63 may use a different threshold value from that Bob 62 to prevent Alice 61's repudiation.

The details of a QKD-based quantum digital signature method using imprecise encryption keys, as illustrated in FIG. 1, are as disclosed in Optics Letters, Vol. 41, No. 21, pp. 4883-4886 (2016).

According to the conventional QKD-based quantum digital signature method of FIG. 1, even if a QKD method that does not require verification of the reliability of upper nodes is used, direct communication between a node receiving messages and a node verifying the messages is at the risk of eavesdropping and tampering at their upper nodes or neighboring nodes and thus may not be secure. That is, the conventional QKD-based quantum digital signature method has a limitation that the actual network needs to be in a full-mesh structure to prove the security of direct communication between particular nodes.

The second conventional quantum digital signature method, i.e., a trusted center-based quantum digital signature method, does not suffer from the problems associated with the conventional QKD-based quantum digital signature method. However, the trusted center-based quantum digital signature method is highly difficult to be implemented because of the use of quantum entanglement. Also, the trusted center-based quantum digital signature method requires the establishment of another system other than a QKD system. Therefore, a new QKD-based quantum digital signature method capable of using a variety of existing QKD networks is needed.

FIG. 2 illustrates a conventional trusted center-based quantum digital signature method.

Referring to FIG. 2, a trusted center-based quantum signature structure 70 may include a signer 71, a trust center 72, and a plurality of verifiers 73 through 77.

The signer 71 may generate a hash and an arbitrary bitstring for a message and may generate a Pauli operator and an arbitrary rotation operator based on the hash and the bitstring. The signer 71 may generate a signature by applying the Pauli operator and the arbitrary rotation operator to quantum entanglement and may send the message and the signature to the trust center 72.

The trust center 72 may extract the Pauli operator by inversely calculating the arbitrary rotation operator from the signature and performing Bell state measurement.

Thereafter, the trust center 72 may calculate the hash and extract the arbitrary bitstring from the message and may verify the signature through a partial disclosure of the arbitrary bitstring.

Thereafter, a signature verification process may be performed between the trust center 72 and each of the verifiers 73 through 77 in a similar manner to that performed between the signer 71 and the trust center 72. In this manner, each of the verifiers 73 through 77 may verify the signature and may then decide whether to accept the message.

The details of the conventional trusted center-based quantum digital signature method of FIG. 2 are as disclosed in Quantum Inf Process Vol. 19, No. 18 (2020).

In short, the first conventional quantum digital signature method has a limitation that the actual network needs to have a full mesh structure, and the second conventional quantum digital signature method has a limitation in that it is difficult to be implemented because of the use of quantum entanglement and requires a separate system to be additionally established.

Accordingly, a quantum digital signature method is needed which can use existing QKD equipment by improving the usability of quantum cryptography communication networks, can reflect the structure of a current actual network, and can thus be applied even to a non-full-mesh network.

SUMMARY

Aspects of the present disclosure provide a quantum key distribution (QKD)-based quantum digital signature method and system.

Aspects of the present disclosure provide a quantum digital signature method and system in a tree network using a trusted center.

Aspects of the present disclosure provide a quantum digital signature method and system that can be used even in a partial mesh network where some nodes are not connected.

Aspects of the present disclosure provide a quantum digital signature method not using quantum entanglement.

However, aspects of the present disclosure are not restricted to those set forth herein. The above and other aspects of the present disclosure will become more apparent to one of ordinary skill in the art to which the present disclosure pertains by referencing the detailed description of the present disclosure given below.

According to an aspect of the present disclosure, there is provided a quantum key distribution (QKD)-based quantum digital signature method using a trusted node, the QKD-based quantum digital signature method being performed by a trusted node. The method comprises sharing a first secret key with a message-sending node, sharing a second secret key with a message-receiving node, generating a first trusted-node signature by performing a partial QKD process together with the message-sending node, generating a second trusted-node signature by performing a partial QKD process together with the message-receiving node, and verifying a first message with the shared first and second secret keys and with the first and second trusted-node signatures.

In some embodiments, the sharing the first secret key may comprise sharing a bitstring having a third length with the message-sending node via a QKD process, the sharing the second secret key may comprise sharing a bitstring having a fourth length with the message-receiving node via a QKD process, the first secret key may be extracted from the bitstring having the third length, and the second secret key may be extracted from the bitstring having the fourth length.

In some embodiments, the bitstrings having the third and fourth lengths may be determined based on a loss rate of a quantum channel between the trusted node and the message-sending node.

In some embodiments, the QKD-based quantum digital signature method may further comprise disclosing a bitstring having a (3-1)-th length, which is part of the bitstring having the third length, and a bitstring having a (4-1)-th length, which is part of the bitstring having the fourth length, wherein the (3-1)-th and (4-1)-th lengths may be the same.

In some embodiments, the QKD-based quantum digital signature method may further comprise identifying a first error rate from the partial QKD process performed together with the message-sending node, using the disclosed bitstring having the (3-1)-th length, and identifying a second error rate from the partial QKD process performed together with the message-receiving node, using the disclosed bitstring having the (4-1)-th length.

In some embodiments, the generating the first trusted-node signature may comprise generating a trusted-node bitstring having a first length, the second trusted-node signature may a trusted-node bitstring having a second length, and a difference between the first and second lengths may be determined based on a loss rate of a quantum channel between the trusted node and the message-sending node.

In some embodiments, the generating the first trusted-node signature may further comprise generating the first trusted-node signature by randomly extracting a trusted-node bitstring having a (1-1)-th length from the trusted-node bitstring having the first length.

In some embodiments, the generating the second trusted-node signature, comprises performing quantum encoding for performing a partial QKD together with the message-receiving node, using a trusted-node bitstring having a (1-2)-th length, which is the entire trusted-node bitstring having the first length, except for the trusted-node bitstring having the (1-1)-th length.

In some embodiments, the verifying the first message may comprise receiving an encrypted first message, which is obtained by encrypting the first message and a message-sending-node bitstring having a first length with the shared first secret key, from the message-sending node, extracting a decrypted first message and a decrypted message-sending-node bitstring having the first length by decrypting the received encrypted first message with the shared first secret key, determining whether the received encrypted first message has been sent by a legitimate sending node by comparing the decrypted message-sending-node bitstring having the first length with a trusted-node bitstring having a (1-1)-th length, sending a secondarily-encrypted first message, which is obtained by encrypting the decrypted first message and a trusted-node bitstring having a second length with the shared second secret key, to the message-receiving node, if a determination is made that the received encrypted first message has been sent by a legitimate sending node, and announcing to the message-receiving node that the message-sending node is a legitimate sending node and signatures for the first message are valid, based on a message-receiving-node bitstring having the second length, disclosed by the message-receiving node, and on the decrypted message-sending-node bitstring having the first length.

In some embodiments, the message-receiving-node bitstring having the second length may be disclosed on a public board by the message-receiving node after determining, based on a decrypted trusted-node bitstring having the second length and the message-receiving-node bitstring having the second length, whether the secondarily-encrypted first message has been sent by a legitimate sending node.

In some embodiments, the determining whether the secondarily-encrypted first message has been sent by a legitimate sending node may comprise determining that the secondarily-encrypted first message has been sent by a legitimate sending node if a number of mismatching bits between the decrypted trusted-node bitstring having the second length and the message-receiving-node bitstring having the second length is less than a second error rate.

In some embodiments, the determining whether the received encrypted first message has been sent by a legitimate sending node may comprise determining that the received encrypted first message has been sent by a legitimate sending node if a number of mismatching bits between the decrypted message-sending-node bitstring having the first length and the trusted-node bitstring having the (1-1)-th length is less than a first error rate.

In some embodiments, the announcing to the message-receiving node may comprise announce to the message-receiving node that the message-sending node is a legitimate sending node and the message-sending-node bitstring having the first length and the trusted-node bitstring having the second length are valid, if a number of mismatching bits between the disclosed message-receiving node bitstring having the second length and the decrypted message-sending-node bitstring having the first length is less than a sum of first and second error rates.

According to the aforementioned and other embodiments of the present disclosure a quantum key distribution (QKD)-based quantum digital signature method using a trusted node, the QKD-based quantum digital signature method being performed by a trusted node, The method comprises generating a first trusted-node signature by performing a partial QKD process together with a message-sending node, and generating a second trusted-node signature by performing a partial QKD process together with a message-receiving node, wherein a difference in length between the first and second trusted-node signatures is determined based on a loss rate of a quantum channel between the trusted node and the message-sending node.

In some embodiments, the generating the first trusted-node signature may comprise generating the first trusted-node signature by extracting a trusted-node bitstring having a (1−1)-th length from a trusted-node bitstring having a first length, and performing quantum encoding for performing a partial QKD together with the message-receiving node, using a trusted-node bitstring having a (1−2)-th length, which is the entire trusted-node bitstring having the first length, except for the trusted-node bitstring having the (1−1)-th length.

According to the aforementioned and other embodiments of the present disclosure a quantum key distribution (QKD)-based quantum digital signature method using a trusted node, the QKD-based quantum digital signature method being performed by a trusted node. The method comprises receiving an encrypted first message, which is obtained by encrypting a first message and a message-sending-node bitstring having a first length with a first secret key, from a message-sending node, extracting a decrypted first message and a decrypted message sending-node bitstring having the first length by decrypting the received encrypted first message with the first secret key, determining whether the received encrypted first message has been sent by a legitimate sending node by comparing the decrypted message-sending-node bitstring having the first length with a trusted-node bitstring having a (1−1)-th length, sending a secondarily-encrypted first message, which is obtained by encrypting the decrypted first message and a trusted-node bitstring having a second length with a second secret key, to the message-receiving node, if a determination is made that the received encrypted first message has been sent by a legitimate sending node, and announcing to the message-receiving node that the message-sending node is a legitimate sending node and signatures for the first message are valid, based on a message-receiving-node bitstring having the second length, disclosed by the message-receiving node, and on the decrypted message-sending-node bitstring having the first length.

In some embodiments, the message-receiving-node bitstring having the second length may be disclosed on a public board by the message-receiving node after determining, based on a decrypted trusted-node bitstring having the second length and the message-receiving-node bitstring having the second length, whether the secondarily-encrypted first message has been sent by a legitimate sending node.

In some embodiments, the determining whether the received encrypted first message has been sent by a legitimate sending node may comprise determining that the received encrypted first message has been sent by a legitimate sending node if a number of mismatching bits between a first message-sending-node signature and a first trusted-node signature is less than a first error rate.

In some embodiments, the announcing to the message-receiving node may comprise announcing to the message-receiving node that the first message has been sent by a legitimate sending node if a number of mismatching bits between a first message-receiving-node signature and a second trusted-node signature is less than a second error rate.

In some embodiments, the first message may be an email or contract, the QKD-based quantum digital signature method may further comprise completing authentication of an identify of a signer of the first message, if a determination is made that the message-sending node is a legitimate sending node and an announcement is made that the signatures for the first message are valid.

It should be noted that the effects of the present disclosure are not limited to those described above, and other effects of the present disclosure will be apparent from the following description.

BRIEF DESCRIPTION OF THE DRAWINGS

The above and other aspects and features of the present disclosure will become more apparent by describing in detail exemplary embodiments thereof with reference to the attached drawings, in which.

DETAILED DESCRIPTION

Hereinafter, preferred embodiments of the present disclosure will be described with reference to the attached drawings. The advantages and features of the present disclosure and methods of accomplishing the same may be understood more readily by reference to the following detailed description of preferred embodiments and the accompanying drawings. The present disclosure may however, be embodied in many different forms and should not be construed as being limited to the embodiments set forth herein. Rather, these embodiments are provided so that this disclosure will be thorough and complete and will fully convey the concept of the disclosure to those skilled in the art, and the present disclosure will only be defined by the appended claims.

In describing the present disclosure, when it is determined that the detailed description of the related well-known configuration or function may obscure the gist of the present disclosure, the detailed description thereof will be omitted.

Hereinafter, some embodiments of the present disclosure will be described in detail with reference to the accompanying drawings.

Figure 1:
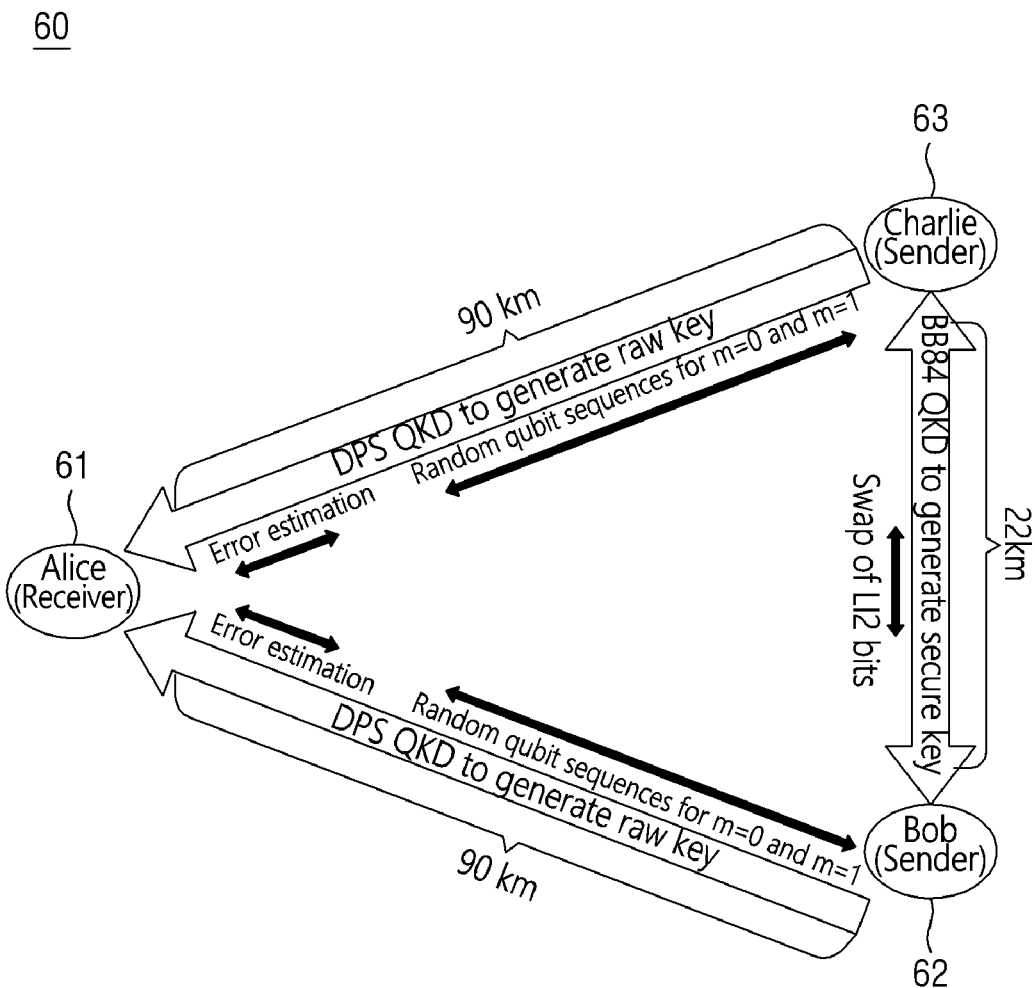
FIG. 1 is a schematic view illustrating a conventional quantum key distribution (QKD)-based quantum digital signature method.
Figure 2:
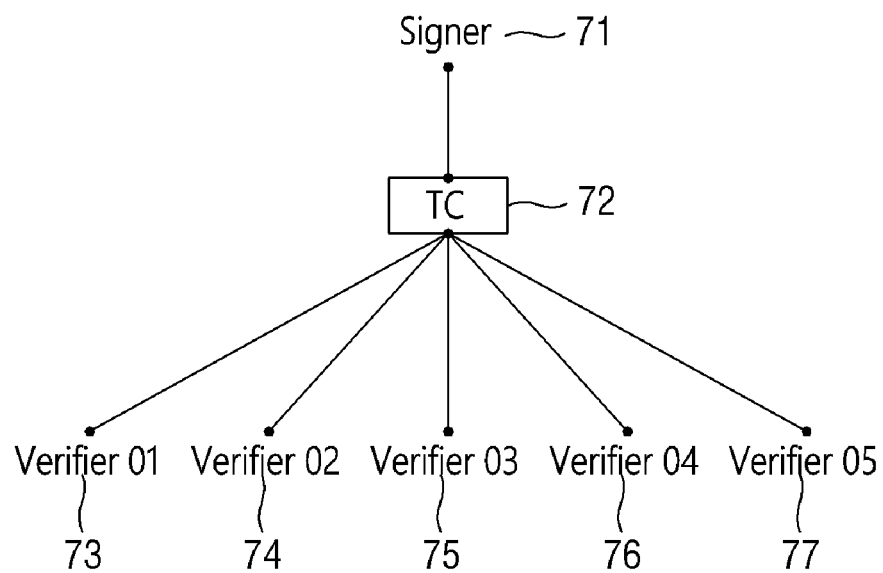
FIG. 2 is a schematic view illustrating a conventional trusted center-based quantum digital signature method.
Figure 3:
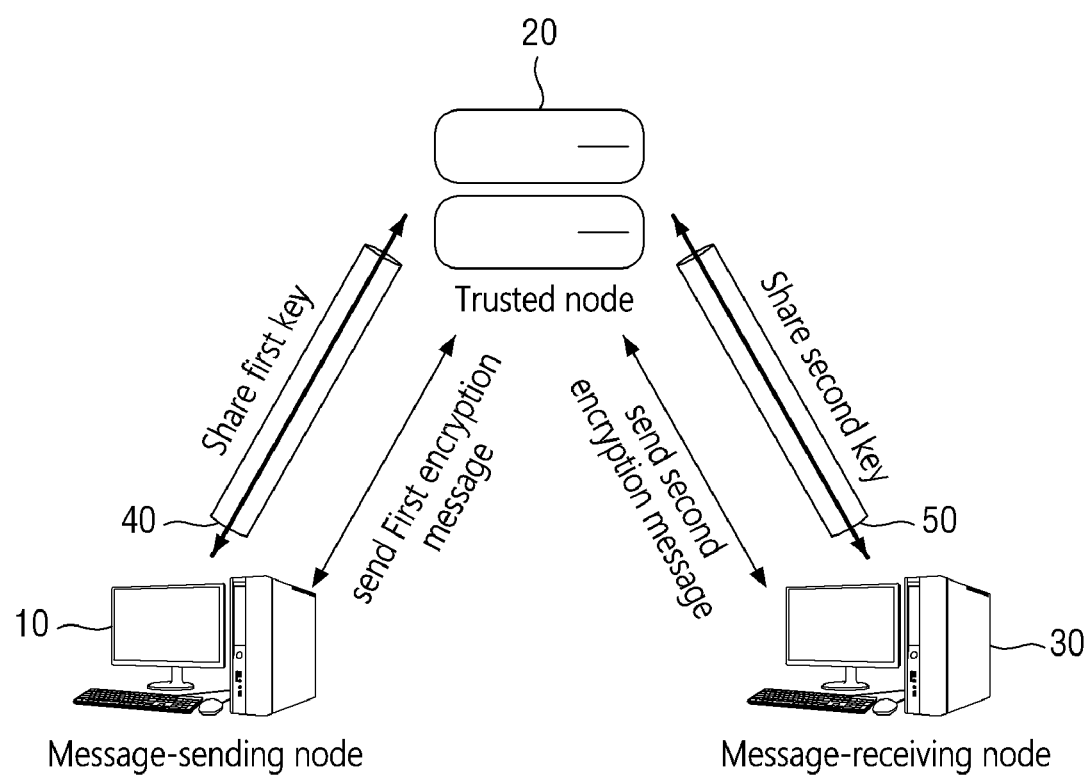
FIG. 3 is a schematic view illustrating a QKD-based quantum digital signature system using a trusted center, according to an embodiment of the present disclosure.

FIG. 3 is a schematic view illustrating a quantum key distribution (QKD)-based quantum digital signature system using a trusted center, according to an embodiment of the present disclosure.

Referring to FIG. 3, the QKD-based quantum digital signature system may include a message-sending node 10, a trusted node 20, a message-receiving node 30, a first quantum channel 40, and a second quantum channel 50.

The message-sending node 10 may encrypt a first message and may send the first message to the message-receiving node 30 via the trusted node 20.

The message-receiving node 30 may receive the first message from the message-sending node 10 via the trusted node 20. In this process, the message-receiving node 30 may verify a signature of the first message received via the trusted node 20.

The trusted node 20 may receive the first message from the message-sending node 10 and may send the first message to the message-receiving node 30. Here, the trusted node 20 may be a node of a network established for quantum communication and may also be a node with its reliability secured.

The trusted node 20 may generate keys and signatures together with the message-sending node 10 and the message-receiving node 30.

The trusted node 20 may perform a QKD process together with the message-sending node 10 and may thus share a bitstring having a predefined length with the message-sending node 10. For example, if the trusted node 20 performs a QKD process sharing a bitstring having a length of (n*L+k+1) (where n, L, k are positive integers of 1 or greater) with the message-sending node 10, the message-sending node 10 may generate a bitstring having the length of (n*L+k+1), and the trusted node 20 may also generate a bitstring having the length of (n*L+k+1).

Similarly, the trusted node 20 may perform a QKD process together with the message-receiving node 30 and may thus share a bitstring having a predefined length with the message-receiving node 30. For example, if the trusted node 20 performs a QKD process sharing a bitstring having a length of (L+k+1) with the message-receiving node 30, the message-receiving node 30 may generate a bitstring having the length of (n*L+k+1), and the trusted node 20 may also generate a bitstring having the length of (n*L+k+1).

A QKD process may be performed between the trusted node 20 and the message-sending node 10 via the first quantum channel 40. A QKD process may be performed between the trusted node 20 and the message-receiving node 30 via the second quantum channel 50. That is, QKD, which is a technique of exchanging encryption keys using the principles of quantum physics, uses quantum channels separate from an existing communication network.

The trusted node 20 may calculate an error rate Sa of the first quantum channel 40 by disclosing a k-bit part of an (n*L+k+1)-bit bitstring generated by the QKD process performed together with the message-sending node 10. The trusted node 20 may calculate an error rate Sb of the second quantum channel 50 by disclosing a k-bit part of an (L+k+1)-bit bitstring generated by the QKD process performed together with the message-receiving node 30.

The trusted node 20 may calculate the loss rate of the first quantum channel 40 by performing a QKD process together with the message-sending node 10 and may calculate the loss rate of the second quantum channel 50 by performing a QKD process together with the message-receiving node 30.

The trusted node 20 may exchange a symmetric key with the message-sending node 10. Not only various well-known algorithms, but also the above-described method of sharing, via the first quantum channel 40, part of a bitstring generated as a result of a QKD process, may be used to exchange a symmetric key between the trusted node 20 and the message-sending node 10.

The trusted node 20 can share secret keys and calculate the loss rates of the first and second quantum channels 40 and 50 by performing QKD processes together with the message-sending node 10 and the message-receiving node 30. Also, the trusted node 20 can calculate the error rates Sa and Sb of the first and second quantum channels 40 and 50 by performing QKD processes together with the message-sending node 10 and the message-receiving node 30 and disclosing parts of bitstrings shared via the QKD processes with the message-sending node 10 and the message-receiving node 30.

The trusted node 20 may receive a first encryption message, which is obtained by encrypting the first message, from the message-sending node 10, may decrypt the first encryption message, and may send a second encryption message, which is obtained by encrypting the decrypted first message, to the message-receiving node 30. The first and second encryption messages may be sent via a public channel. Here, the public channel may use an existing communications protocol such as Transmission Control Protocol/Internet Protocol (TCP/IP).

The trusted node 20 may generate a signature for verifying the first encryption message, via a partial QKD process.

For example, the trusted node 20 may exchange (or share) an n*L-bit bitstring by performing a partial QKD process, which is a QKD process without post processes to be performed together with the message-sending node 10. The message-sending node 10 may use an n*L-bit bitstring or only part of the n*L-bit bitstring as a first message-sending-node signature. The trusted node 20 may use a generated n*L-bit bitstring as a first trusted-node signature or may randomly extract an L-bit part of the generated n*L-bit bitstring and use the extracted L-bit part as the first trusted-node signature.

After performing a partial QKD process together with the message-sending node 10, the trusted node 20 may perform a partial QKD process together with the message-receiving node 30 to share an L-bit bitstring. The message-receiving node 30 may use an L-bit bitstring or only part of the L-bit bitstring as a first message-receiving-node signature. The trusted node 20 may also use a generated L-bit bitstring or only part of the generated L-bit bitstring as a second trusted-node signature.

The trusted node 20 may use an (n−1)*L-bit part of an n*L-bit bitstring generated by the QKD process performed together with the message-sending node 10, to perform a partial QKD process together with the message-sending node 10. Here, the (n−1)*L-bit part of the n*L-bit bitstring may be used to perform quantum encoding during a partial QKD process to be performed together with the message-receiving node 30.

The trusted node 20 may verify the signatures generated in its relationships with the message-sending node 10 and the message-receiving node 30.

The trusted node 20 may receive an encrypted first message from the message-sending node 10. The encrypted first message may be a message obtained by encrypting, by the message-sending node 10, the first message and the first message-sending-node signature with a shared first secret key. Here, the first message-sending-node signature may be a bitstring having a first length, and the shared first secret key may be a bitstring extracted from a bitstring having a third length, shared via a QKD process.

The trusted node 20 may decrypt the encrypted first message with the shared first secret key. Here, the shared first secret key may be a bitstring extracted from a bitstring having the third length, shared via a QKD process.

The trusted node 20 may verify the encrypted first message, which is received from the message-sending node 10, using the first trusted-node signature, which is stored. Here, the first trusted-node signature may be a randomly-extracted L-bit part of a generated n*L-bit bitstring.

If the encrypted first message is verified, the trusted node 20 may decrypt the encrypted first message, secondarily encrypt the decrypted first message and a trusted-node bitstring having a second length with a shared second secret key, and may send the secondarily-encrypted first key to the message-sending node 30.

The trusted node 20 may finally announce to the message-receiving node 30 that the message-sending node 30 is a legitimate sending node and the signatures for the first message are valid, based on a message-receiving-node bitstring having the second length and a decrypted message-sending-node bitstring having the first length, disclosed by the message-receiving node 30.

According to the embodiment of FIG. 3, digital signatures can be generated between three parties via a trusted node by using a partial QKD method, and a quantum digital signature method can be used even in a non-full-mesh encryption communication network, without the need to use quantum entanglement.

It is noted that the elements of the QKD-based quantum digital signature system, including the trusted node 20, simply represents functional elements that are distinct from one another functionally, and can be integrated into fewer elements in an actual physical environment. For example, at least parts of the trusted node 20 may be implemented as different logics in one physical computing device.

Also, in an actual physical environment, each of the elements of the QKD-based quantum digital signature system may be divided into a plurality of detailed functional elements. For example, a first function of the trusted node 20 may be implemented in a first computing device, and a second function of the trusted node 20 may be implemented in a second computing device.

Also, as illustrated in FIG. 3, the message-sending node 10, the message-receiving node 30, and the trusted node 20 may communicate with one another via a network. Here, the network may be implemented as various types of wired/wireless networks such as a Local Area Network (LAN), a Wide Area Network (WAN), a mobile radio communication network, and Wireless Broadband Internet (WiBro).

A QKD-based quantum digital signature system using a trusted center and its network environment, according to an embodiment of the present disclosure, have been described with reference to FIG. 3. A QKD-based quantum digital signature method using a trusted center, according to an embodiment of the present disclosure, will hereinafter be described with reference to FIG. 4. For the convenience of understanding, the QKD-based quantum digital signature method will hereinafter be described, taking the environment illustrated in FIG. 3 as an example, but obviously, various modifications can be made to the environment for a QKD-based quantum digital signature system.

Steps of the QKD-based quantum digital signature method that will hereinafter be described may be performed by a computing device. In other words, each of the steps of the QKD-based quantum digital signature method may be implemented as one or more instructions to be executed by a processor of a computing device. The steps of the QKD-based quantum digital signature method may all be executed by one physical computing device, but the present disclosure is not limited thereto. Alternatively, some of the steps of the QKD-based quantum digital signature method may be performed by one computing device, and some of the steps of the QKD-based quantum digital signature method may be performed by another computing device. That is, the steps of the QKD-based quantum digital signature method may be performed by a computing system. In the description that follows, it is assumed that the steps of the QKD-based quantum digital signature method may performed by the trusted node 20, unless specified otherwise. For convenience, descriptions of by which the steps of the QKD-based quantum digital signature method are performed will be omitted. Also, the order in which the steps of the QKD-based quantum digital signature method are performed may vary as needed.

Figure 4:
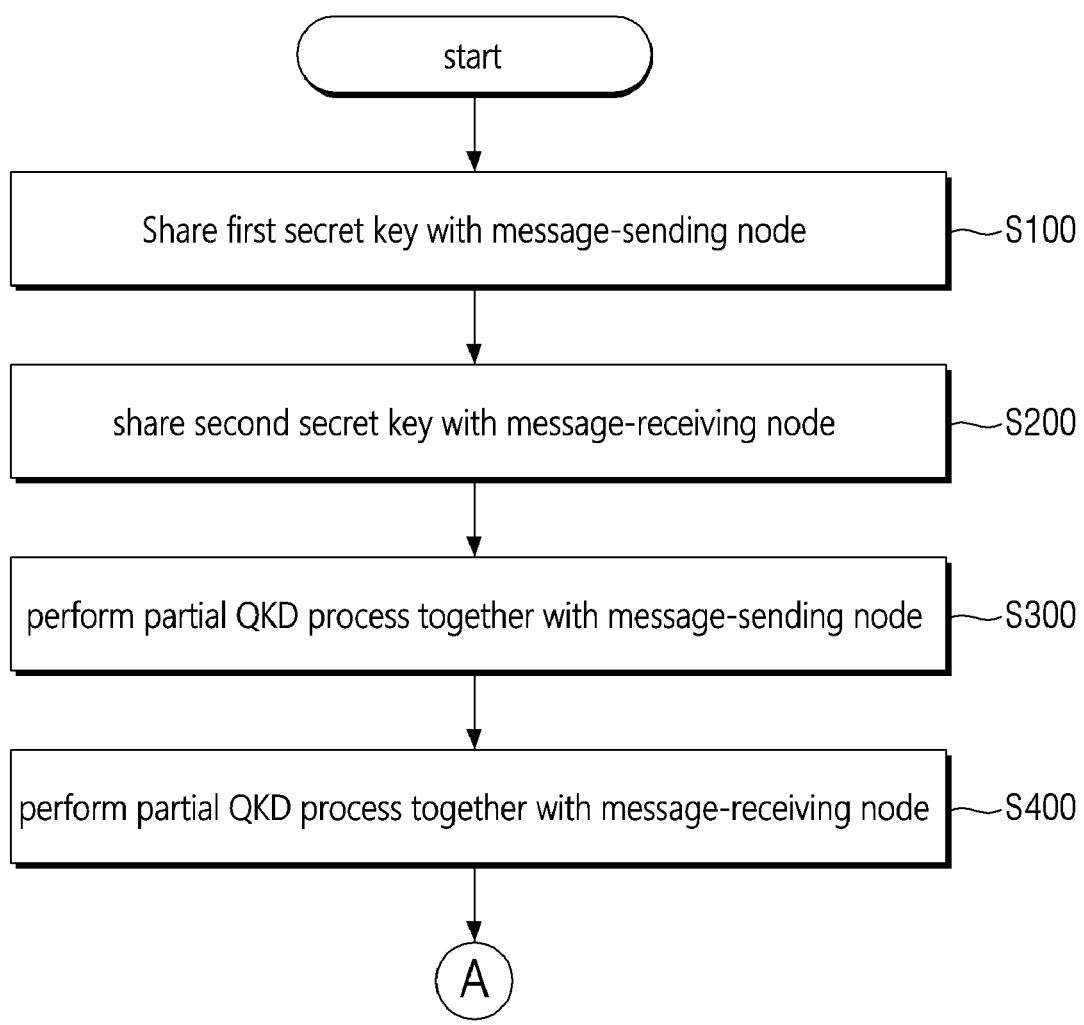
FIG. 4 is a flowchart illustrating a QKD-based quantum digital signature method using a trusted center, according to an embodiment of the present disclosure.

FIG. 4 is a flowchart illustrating a QKD-based quantum digital signature method using a trusted center, according to an embodiment of the present disclosure.

Referring to FIG. 4, in S100, a first secret key may be shared between the trusted node 20 and the message-sending node 10. The first secret key may be a symmetric key. The first secret key may be extracted from a bitstring having the third length, shared between the trusted node 20 and the message-sending node 10 via a QKD method.

The trusted node 20 and the message-sending node 10 may share the first secret key using the QKD method.

An example of how to share a first secret key between the trusted node 20 and the message-sending nod 10 will hereinafter be described with reference to FIG. 5.

Figure 5:
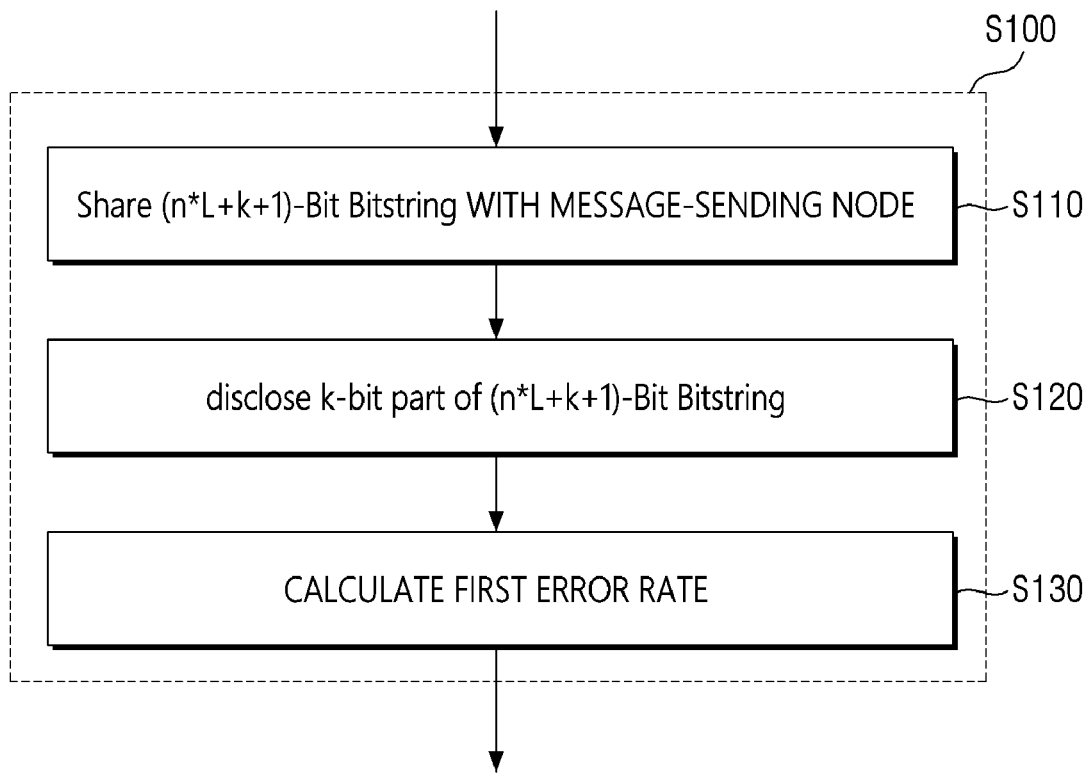
FIG. 5 is a detailed flowchart illustrating how to share a first secret key with a message-sending node, as performed in the QKD-based quantum digital signature method of FIG. 4.

Referring to FIG. 5, the trusted node 20 and the message-sending node 10 may share an (n*L+k+1)-bit bitstring (S110). Here, the (n*L+k+1)-bit bitstring may refer to a shared bitstring having the third length.

In S120, the trusted node 20 may disclose a k-bit part of the (n*L+k+1)-bit bitstring.

In S130, the trusted node 20 may calculate the error rate Sa with the message-sending node 10, using the disclosed k-bit part. Here, the error rate Sa may refer to the error rate of the first quantum channel 40 between the trusted node 20 and the message-sending node 10.

An n*L-bit bitstring extracted from the (n*L+k+1)-bit bitstring may be the first secret key shared between the message-sending node 10 and the trusted node 20. The first secret key may be a symmetric key.

The positive integer n as in the (n*L+k+1)-bit bitstring may be determined in consideration of the loss rate of the first quantum channel 40. Here, the loss rate of the first quantum channel 40 may be calculated by performing a QKD process between the trusted node 20 and the message-sending node 10.

Referring again to FIG. 4, in S200, a second secret key may be shared between the trusted node 20 and the message-receiving node 30. The second secret key may be a symmetric key. The second secret key may be extracted from a bitstring having the fourth length, shared between the trusted node 20 and the message-receiving node 30 via the QKD method.

The trusted node 20 and the message-receiving node 30 may share the second secret key using the QKD method.

It will hereinafter be described, with reference to FIG. 6, how the trusted node 20 and the message-receiving node 30 share the second secret key.

Figure 6:
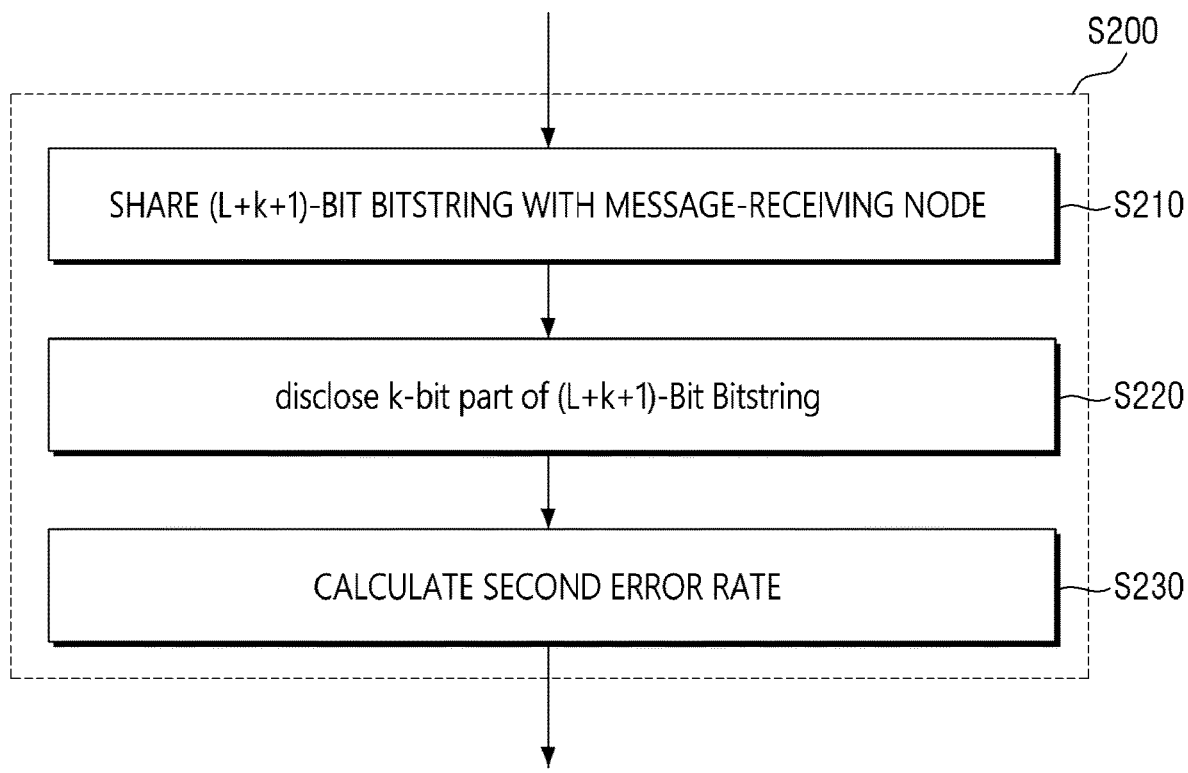
FIG. 6 is a detailed flowchart illustrating how to share a second secret key with a message-receiving node, as performed in the QKD-based quantum digital signature method of FIG. 4.

Referring to FIG. 6, the trusted node 20 and the message-receiving node 30 may share an (L+k+1)-bit bitstring (S210). The (L+k+1)-bit bitstring may be a bitstring having the fourth length.

In S220, the trusted node 20 may disclose a k-bit part of the (L+k+1)-bit bitstring.

In S230, the trusted node 20 may calculate the error rate Sb with the message-receiving node 30, using the disclosed k-bit part. Here, the error rate Sb may refer to the error rate of the second quantum channel 50 between the trusted node 20 and the message-receiving node 30.

An L-bit part of the (L+k+1)-bit bitstring may be the second secret key shared between the message-receiving node 30 and the trusted node 20. The second secret key may be a symmetric key.

The (n*L+k+1)-bit bitstring shared between the trusted node 20 and the message-sending node 10 and the (L+k+1)-bit bitstring shared between the trusted node 20 and the message-receiving node 30 may be determined based on the loss rate of the first quantum channel 40.

A k-bit bitstring disclosed in S120 and a k-bit bitstring disclosed in S220 may be different bitstrings having the same length.

The trusted node 20 can calculate the loss rates of the first and second quantum channels 40 and 50 by performing QKD processes, which include post processes, together with the message-sending node 10 and the message-receiving node 30. Also, the trusted node 20 can calculate the error rates Sa and Sb of the first and second quantum channels 40 and 50 by disclosing parts of bitstreams shared by performing QKD processes together with the message-sending node 10 and the message-receiving node 30.

Referring again to FIG. 4, in S300, a partial QKD process may be performed between the trusted node 20 and the message-sending node 10.

The trusted node 20 and the message-sending node 10 may perform a partial QKD process together and may thus generate the first trusted-node signature and the first message-sending node signature, respectively.

The trusted node 20 and the message-sending node 10 may generate n*L-bit bitstrings by performing a partial QKD process together as many times as n*L.

Here, the n*L-bit bitstring generated by the trusted node 20 may be a trusted-node bitstring having the first length, and the n*L-bit bitstring generated by the message-sending node 10 may be a message-sending-node bitstring having the first length.

The trusted-node bitstring having the first length may be the first trusted-node signature, and the message-sending-node bitstring having the first length may be the first message-sending-node signature.

An example of how to perform a partial QKD process between the trusted node 20 and the message-sending node 10 will hereinafter be described with reference to FIG. 7.

Figure 7:
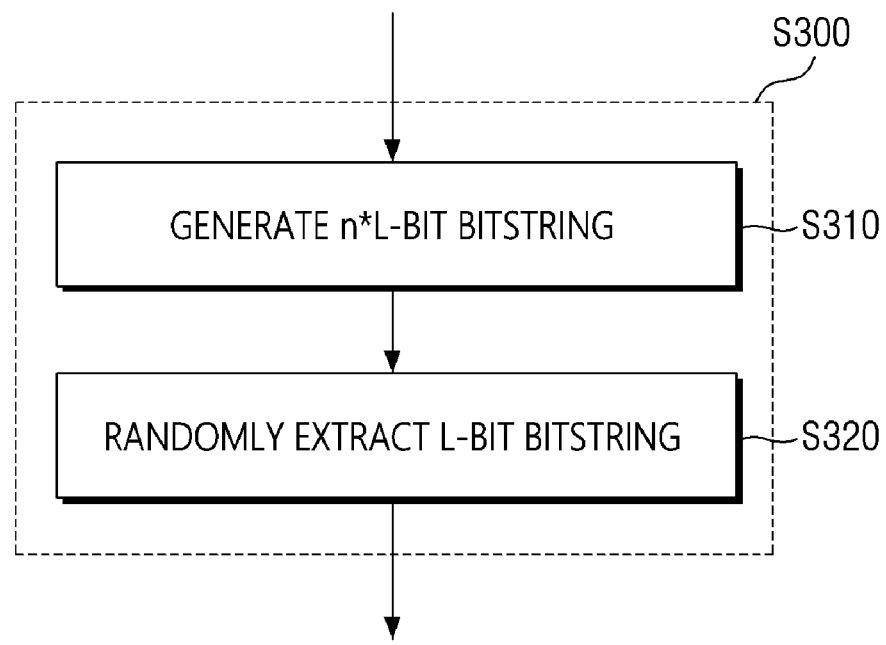
FIG. 7 is a detailed flowchart illustrating how to perform a partial QKD with the message-sending node, as performed in the QKD-based quantum digital signature method of FIG. 4.

Referring to FIG. 7, in S310, the trusted node 20 may generate an n*L-bit bitstring by performing a partial QKD process together with the message-sending node 10.

In S320, a random L-bit part of the n*L-bit bitstring may be extracted.

The extracted L-bit part may be the first trusted-node signature.

The rest of the n*L-bit bitstring may be used in a partial QKD process to be performed between the trusted node 20 and the message-receiving node 30, and this will be described later with reference to FIG. 8.

Referring again to FIG. 4, in S400, a partial QKD process may be performed between the trusted node 20 and the message-receiving node 30.

The trusted node 20 and the message-receiving node 30 may perform a partial QKD process together and may thus generate the second trusted-node signature and the first message-receiving node signature, respectively.

The trusted node 20 and the message-receiving node 30 may generate L-bit bitstrings by performing a partial QKD process together as many times as L.

Here, the L-bit bitstring generated by the trusted node 20 may be a trusted-node bitstring having the second length, and the L-bit bitstring generated by the message-receiving node 30 may be a message-receiving-node bitstring having the second length.

The trusted-node bitstring having the second length may be the second trusted-node signature, and the message-sending-node bitstring having the second length may be the first message-receiving-node signature.

The difference between the first and second lengths may be determined based on the loss rate of the first quantum channel 40.

An example of how to perform a partial QKD process between the trusted node 20 and the message-receiving node 30 will hereinafter be described with reference to FIG. 8.

Figure 8:
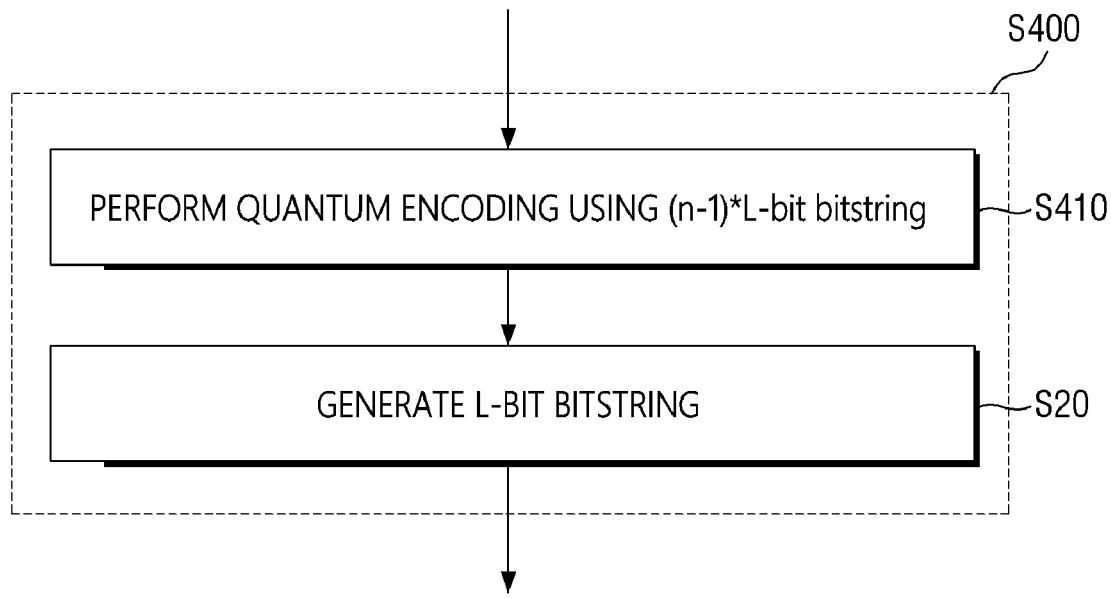
FIG. 8 is a detailed flowchart illustrating how to perform a partial QKD with the message-receiving node, as performed in the QKD-based quantum digital signature method of FIG. 4.

Referring to FIG. 8, in S410, an (n−1)*L-bit bitstring, which is a bitstring obtained in S320 by extracting a random L-bit part of the n*L-bit bitstring generated in S310, may be used to perform a partial QKD process between the trusted node 20 and the message-receiving node 30. Here, the (n−1)*L-bit bitstring may be used to perform quantum encoding for performing a partial QKD process between the trusted node 20 and the message-receiving node 30.

In S420, the trusted node 20 and the message-receiving node 30 may perform a partial QKD process together and may thus generate L-bit bitstrings.

During the partial QKD process performed between the trusted node 20 and the message-receiving node 30, the (n−1)*L-bit bitstring, which is stored in the trusted node 20, may be used for quantum encoding.

According to the embodiment of FIGS. 4 through 8, the trusted node 20 can not only generate the first trusted-node signature, but also secure a bitstring for performing quantum encoding, using bitstrings shared by the partial QKD process performed together with the message-sending node 10.

Figure 9:
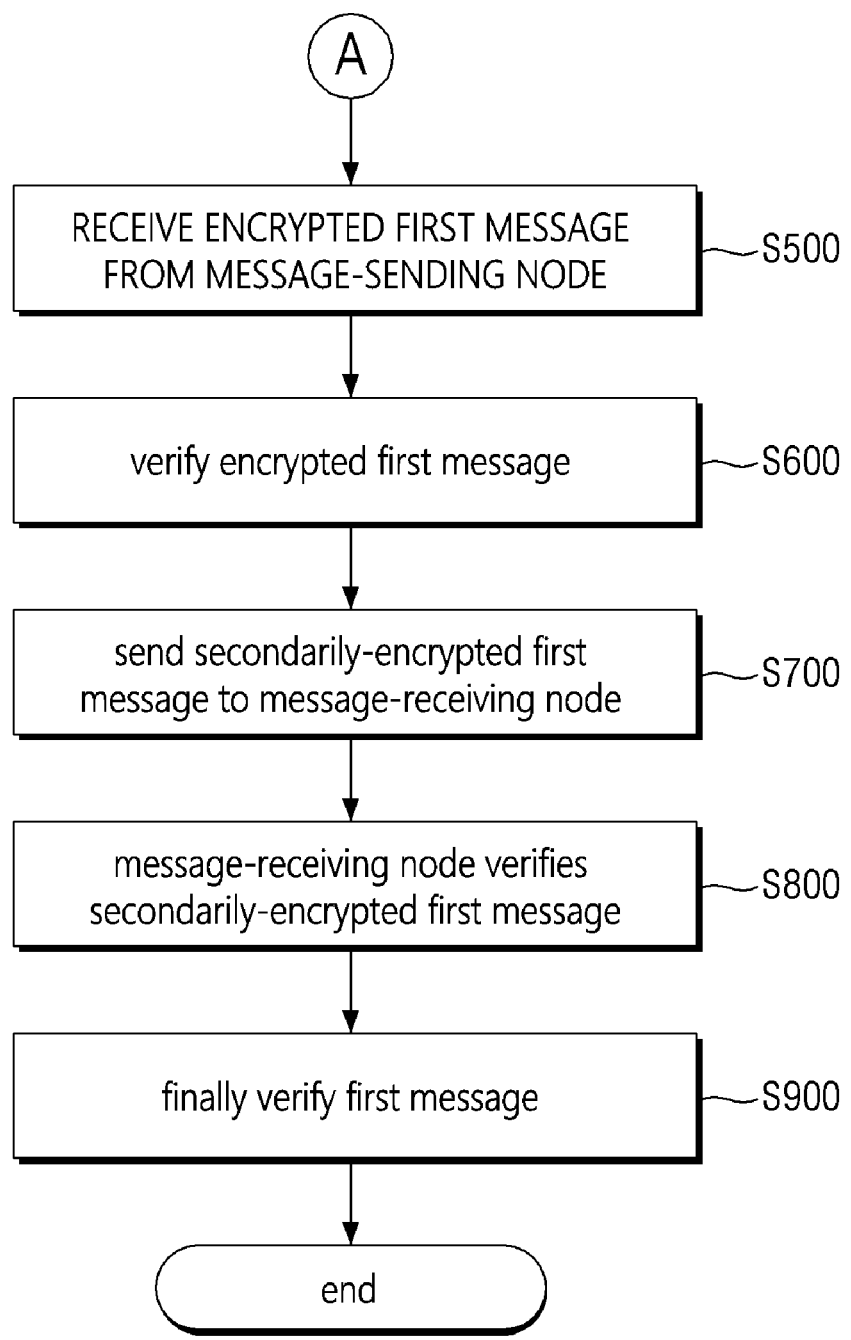
FIG. 9 is a flowchart illustrating a method of verifying a QKD-based quantum digital signature according to an embodiment of the present disclosure.

FIG. 9 is a flowchart illustrating a method of verifying a QKD-based quantum digital signature according to an embodiment of the present disclosure.

Referring to FIG. 9, in S500, the trusted node 20 may receive the encrypted first message from the message-sending node 10.

The encrypted first message may be a message obtained by encrypting, by the message-sending node 10, the first message and a message-sending-node signature having the first length with the shared first secret key.

The message-sending-node signature having the first length may be an n*L-bit bitstring generated by the partial QKD process performed between the message-sending node 10 and the trusted node 20. The message-sending-node signature having the first length may be the first message-sending-node signature.

The shared first secret key may be an n*L-bit bitstring extracted from an (n*L+k+1)-bit bitstring generated by the QKD process performed between the trusted node 20 and the message-sending node 10.

The shared first secret key may be a symmetric key. Here, the trusted node 20 and the message-sending node 10 may share symmetric keys using various well-known algorithms.

In S600, the trusted node 20 may verify the encrypted first message.

The trusted node 20 may extract a decrypted first message and a decrypted message-sending-node bitstring having the first length by decrypting the encrypted first message with the shared first secret key.

The decrypted first message may be the same message as that used to generate the encrypted first message, and the decrypted message-sending-node bitstring having the first length may be the same bitstring as that used to generate the encrypted first message.

The trusted node 20 may decrypt the encrypted first message and may compare the decrypted message-sending-node bitstring having the first length with a trusted-node bitstring having a (1–1)-th length to determine whether the encrypted first message has been sent by a legitimate sending node.

The trusted-node bitstring having the (1–1)-th length may be a first trusted-node signature extracted randomly from the trusted-node bitstring having the first length, the (1–1)-th length may be L, and the first length may be n*L.

An example of how to verify the encrypted first message will hereinafter be described with reference to FIG. 10.

Figure 10:
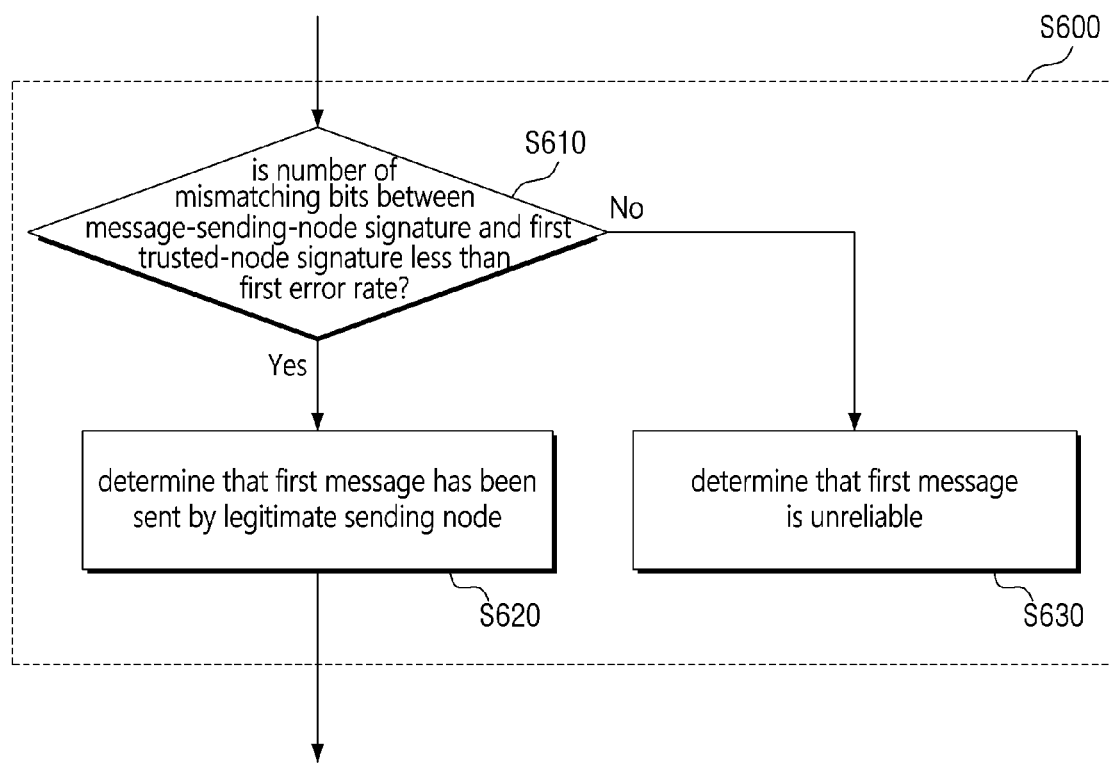
FIG. 10 is a detailed flowchart illustrating how to verify an encrypted first message, as performed in the method of FIG. 9.

Referring to FIG. 10, in S610, the trusted node 20 may determine whether the number of mismatching bits between the first message-sending-node signature and the first trusted-node signature is less than the error rate Sa.

The first message-sending-node signature may be a sending-node bitstring having the first length, generated by the partial QKD process performed between the message-sending node 10 and the trusted node 20. Here, the first length may be n*L.

The first trusted-node signature may be a trusted-node bitstring having the (1–1)-th length, extracted from a trusted-node bitstring having the first length, generated by the partial QKD process performed between the trusted node 20 and the message-sending node 10. Here, the trusted-node bitstring having the first length may be an n*L-bit bitstring, and the trusted-node bitstring having the (1–1)-th length may be an L-bit bitstring.

The error rate Sa may be the error rate of the first quantum channel 40 between the trusted node 20 and the message-sending node 10.

In S630, if a determination is made that the number of mismatching bits between the first message-sending-node signature and the first trusted-node signature is not less than the first error rate Sa, the first message may be determined as being unreliable.

This may mean that the first message may have been eavesdropped or hacked by a third party and is thus not reliable.

On the contrary, in S620, if a determination is made that the number of mismatching bits between the first message-sending-node signature and the first trusted-node signature is less than the first error rate Sa, the first message may be determined as being reliable, and this may mean that the first message has been sent by a legitimate sending node.

Referring again to FIG. 9, in S700, if the encrypted first message is verified, the decrypted first message and the trusted-node bitstring having the second length may be secondarily encrypted with the shared second secret key, and the secondarily-encrypted first message may be sent to the message-sending node 30.

Here, the decrypted first message may be the same message as that used by the message-sending node 10 to generate the encrypted first message.

The trusted-node bitstring having the second length may be an L-bit bitstring generated by the partial QKD process performed between the trusted node 20 and the message-receiving node 30.

The shared second secret key may be an L-bit bitstring extracted from the bitstring having the fourth length, shared between the trusted node 20 and the message-receiving node 30 via the QKD method.

In S800, the secondarily-encrypted first message may be verified as to whether it has been sent by a legitimate sending node.

An example of how to verify the secondarily-encrypted first message will hereinafter be described with reference to FIG. 11.

Figure 11:
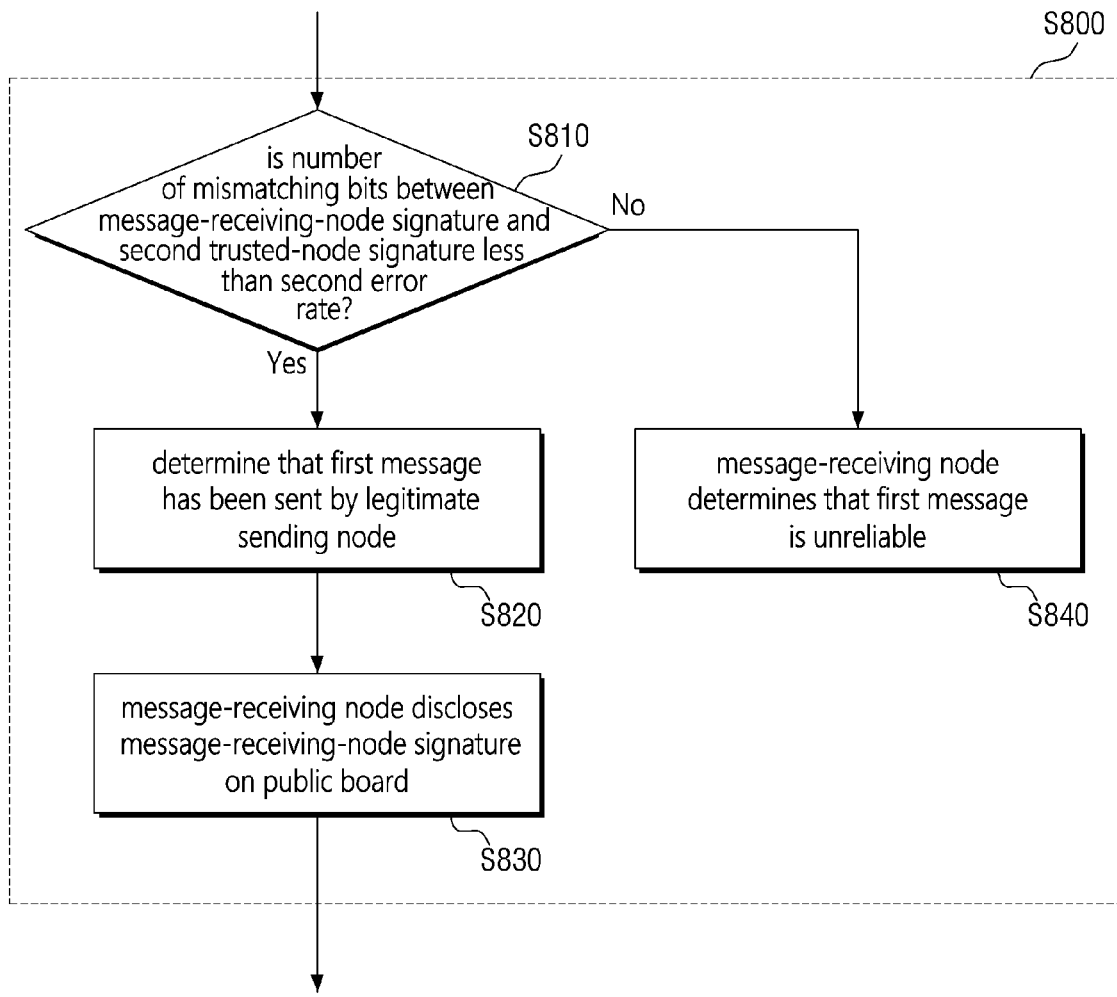
FIG. 11 is a detailed flowchart illustrating how a message-receiving node can verify a secondarily-encrypted first message, as performed in the method of FIG. 9.

Referring to FIG. 11, in S810, the message-receiving node 30 may determine whether the number of mismatching bits between the first message-receiving-node signature and the second trusted-node signature is less than the error rate Sb.

The first message-receiving-node signature may be a receiving-node bitstring having the second length, generated by the partial QKD process performed between the message-receiving node 30 and the trusted node 20. Here, the second length may be L.

The second trusted-node signature may be a trusted-node bitstring having the second length, generated by the partial QKD process performed between the trusted node 20 and the message-receiving node 30. Here, the second length may be L.

The error rate Sb may be the error rate of the second quantum channel 50 between the trusted node 20 and the message-receiving node 30.

In S840, if a determination is made that the number of mismatching bits between the first message-receiving-node signature and the second trusted-node signature is not less than the error rate Sb, the first message may be determined as being unreliable.

This may mean that the first message may have been eavesdropped or hacked by a third party and is thus not reliable.

On the contrary, in S820, if a determination is made that the number of mismatching bits between the first messagereceiving-node signature and the second trusted-node signature is less than the second error rate Sb, the first message may be determined as being reliable, and this may mean that the first message has been sent by a legitimate sending node.

In S830, the message-receiving node 30 may disclose the first message-receiving-node signature on a public board.

On the public board, information desired by each node is disclosed so that anyone can see it, and the disclosed information may be information that cannot be tampered with. The public board may be implemented by various well-known methods using message authentication codes and authentication techniques.

For example, if the first message is disclosed on the public board, the first message may be information that can be viewed by anyone and cannot be tampered with. That is, the first message may be disclosed on the public board if it is information that does not require confidentiality, unlike an employment contract.

Referring again to FIG. 9, in S900, the first message may be finally verified by the trusted node 20.

An example of how to finally verify the first message will hereinafter be described with reference to FIG. 12.

Figure 12:
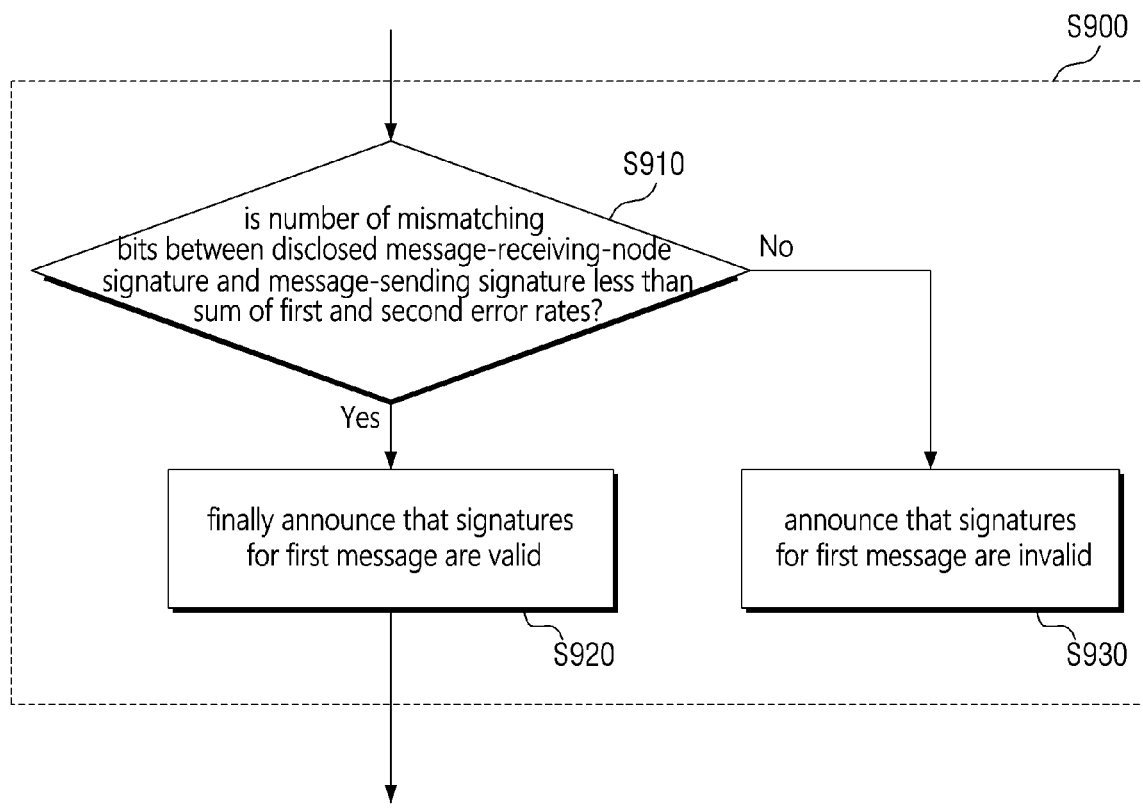
FIG. 12 is a detailed flowchart illustrating how to finally verify the first message, as performed in the method of FIG. 9.

Referring to FIG. 12, in S910, the trusted node 20 may determine whether the number of mismatching bits between the first message-receiving-node signature, disclosed by the message-receiving node 30, and the first message-sending-node signature is less than the sum of the error rates Sa and Sb.

The first message-receiving-node signature may be a message-receiving-node bitstring having the second length. Here, the second length may be L.

In S930, if a determination is made that the number of mismatching bits between the first message-receiving-node signature and the first message-sending-node signature is not less than the sum of the error rates Sa and Sb, it may be announced that the signatures for the first message are not valid.

This may mean that the trusted node 20 announces that the first message-sending-node signature or the first message-receiving-node signature is not valid.

In S920, if a determination is made that the number of mismatching bits between the first message-receiving-node signature and the first message-sending-node signature is less than the sum of the error rates Sa and Sb, it may be finally announced that the signatures for the first message are valid.

This may mean that the trusted node 20 finally announces that the first message-sending-node signature and the first message-receiving-node signature are valid.

According to the embodiments of FIGS. 4 through 12, as tripartite digital signatures can be generated by a trusted center via partial QKD processes, a quantum digital signature method can be implemented, even in a non-full-mesh encryption communication network, by software using an existing QKD system, without the need to use quantum entanglement.

The QKD-based quantum digital signature method using a trusted center, according to an embodiment of the present disclosure, is applicable to various fields of secure communications using quantum cryptography, such as wired and wireless infrastructure protection technology, authentication access technology, and quantum cryptographic network equipment. In particular, the QKD-based quantum digital signature method using a trusted center, according to an embodiment of the present disclosure, can be used for the authentication of various types of messages such as emails, contracts, or data transmitted via complex encryption protocols. Also, the QKD-based quantum digital signature method using a trusted center, according to an embodiment of the present disclosure, can be used to verify the sources of documents and ensure the identities of signers. Also, the QKD-based quantum digital signature method using a trusted center, according to an embodiment of the present disclosure, can be used in various programs for digital signing using high-security certificates.

Figure 13:
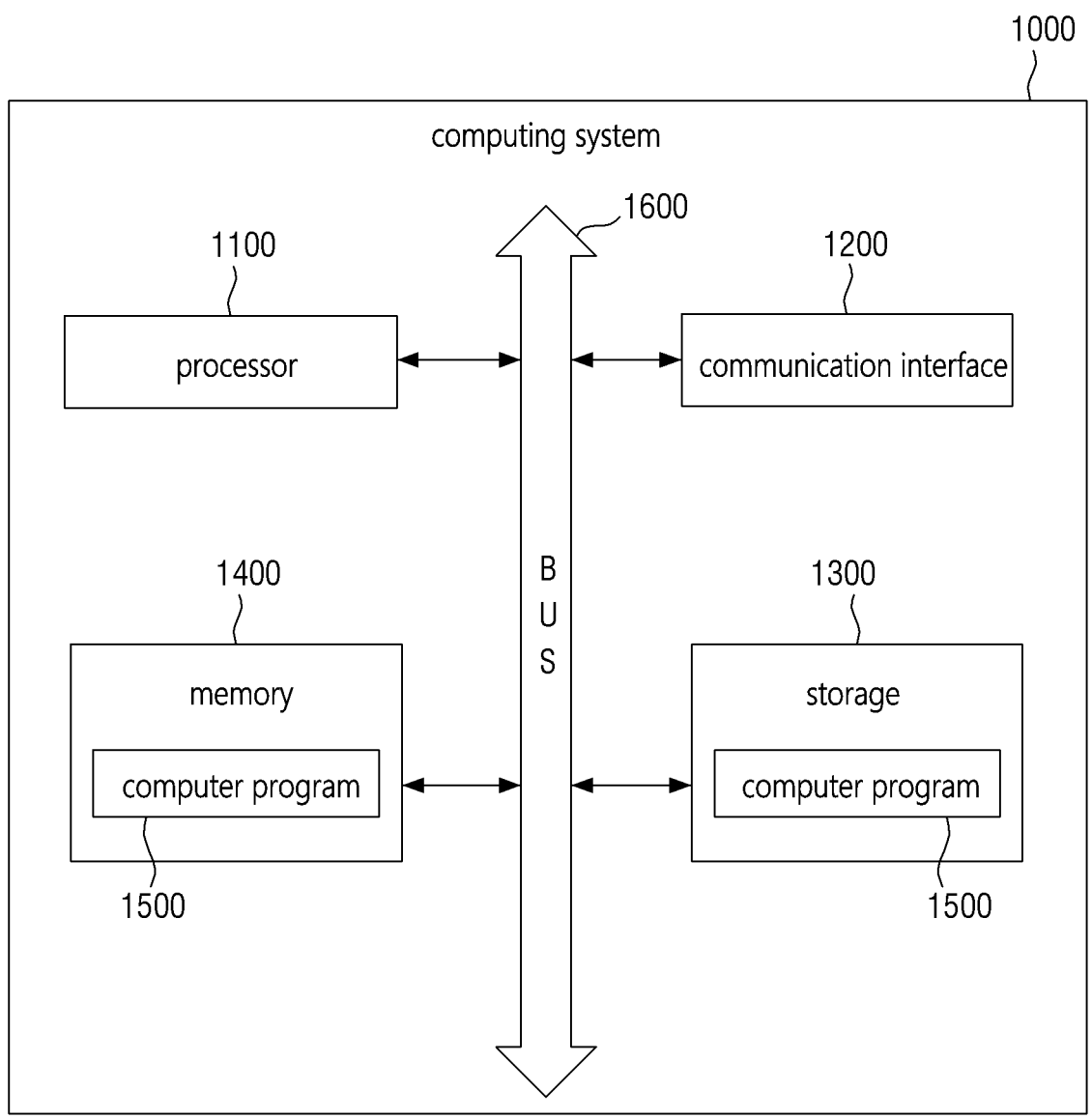
FIG. 13 is a hardware configuration view of a computing system according to some embodiments of the present disclosure.

FIG. 13 is a hardware configuration view of a computing system according to some embodiments of the present disclosure. Referring to FIG. 13, a computing system 1000 may be, for example, a computing system including the trusted node 20 of FIG. 3 or including the message-sending node 10 or the message-receiving node 30 of FIG. 3. The computing system 1000 may include one or more processors 1100, a bus 1600, a communication interface 1200, a memory 1400, which loads a computer program 1500 executed by the processors 1100, and a storage 1300 for storing the computer program 1500.

The processor 1100 controls overall operations of each component of computing system 1000. The processor 1100 may perform calculations on at least one application or program for executing a method/operation according to various embodiments of the present disclosure. The memory 1400 stores various data, instructions and/or information. The memory 1400 may load one or more programs 1500 from the storage 1300 to execute methods/operations according to various embodiments of the present disclosure. The bus 1600 provides communication between components of computing system 1000. The communication interface 1200 supports internet communication of the computing system 1000. The storage 1300 can non-temporarily store one or more computer programs 1500. The computer program 1500 may include one or more instructions, on which the methods/operations according to various embodiments of the present disclosure are implemented. When the computer program 1500 is loaded on the memory 1400, the processor 1100 may perform the methods/operations in accordance with various embodiments of the present disclosure by executing the one or more instructions.

In some embodiments, a computer program 1500 may perform, for example, a method performed by a trusted node, and the method may include: sharing a first secret key with a message-sending node; sharing a second secret key with a message-receiving node; generating a first trusted-node signature by performing a partial QKD process together with the message-sending node; generating a second trusted-node signature by performing a partial QKD process together with the message-receiving node; and verifying a first message with the shared first and second secret keys and with the first and second trusted-node signatures.

The technical features of the present disclosure described so far may be embodied as computer readable codes on a computer readable medium.

The computer program recorded on the computer readable medium may be transmitted to other computing device via a network such as internet and installed in the other computing device, thereby being used in the other computing device.

Although operations are shown in a specific order in the drawings, it should not be understood that desired results can be obtained when the operations must be performed in the specific order or sequential order or when all of the operations must be performed. In certain situations, multitasking and parallel processing may be advantageous. In concluding the detailed description, those skilled in the art will appreciate that many variations and modifications can be made to the preferred embodiments without substantially departing from the principles of the present disclosure. Therefore, the disclosed preferred embodiments of the disclosure are used in a generic and descriptive sense only and not for purposes of limitation.

What is claimed is:

1. A quantum key distribution (QKD)-based quantum digital signature method using a trusted node, the QKD-based quantum digital signature method being performed by the trusted node and comprising:
   sharing a first secret key with a message-sending node;
   sharing a second secret key with a message-receiving node;
   generating a first trusted-node signature by performing a partial QKD process together with the message-sending node;
   generating a second trusted-node signature by performing a partial QKD process together with the message-receiving node; and
   verifying a first message with the shared first and second secret keys and with the first and second trusted-node signatures,
   wherein
   the first trusted-node signature is a trusted-node bitstring having a first length,
   the second trusted-node signature is a trusted-node bitstring having a second length, and
   a difference between the first length and the second length is determined based on a loss rate of a quantum channel between the trusted node and the message-sending node.

2. The QKD-based quantum digital signature method of claim 1, wherein
   the sharing the first secret key, comprises sharing a bitstring having a third length with the message-sending node via a QKD process,
   the sharing the second secret key, comprises sharing a bitstring having a fourth length with the message-receiving node via a QKD process,
   the first secret key is extracted from the bitstring having the third length, and
   the second secret key is extracted from the bitstring having the fourth length.

3. The QKD-based quantum digital signature method of claim 2, wherein the bitstrings having the third and fourth lengths are determined based on the loss rate of the quantum channel between the trusted node and the message-sending node.

4. The QKD-based quantum digital signature method of claim 2, further comprising:
   disclosing a bitstring having a (3-1)-th length, which is part of the bitstring having the third length, and a bitstring having a (4-1)-th length, which is part of the bitstring having the fourth length,
   wherein the (3-1)-th and (4-1)-th lengths are the same.

5. The QKD-based quantum digital signature method of claim 4, further comprising:
   identifying a first error rate from the partial QKD process performed together with the message-sending node, using the disclosed bitstring having the (3-1)-th length, and identifying a second error rate from the partial QKD process performed together with the message-receiving node, using the disclosed bitstring having the (4-1)-th length.

6. The QKD-based quantum digital signature method of claim 1, wherein the generating the first trusted-node signature, further comprises generating the first trusted-node signature by randomly extracting a trusted-node bitstring having a (1-1)-th length from the trusted-node bitstring having the first length.

7. The QKD-based quantum digital signature method of claim 6, wherein the generating the second trusted-node signature, comprises performing quantum encoding for performing a partial QKD together with the message-receiving node, using a trusted-node bitstring having a (1-2)-th length, which is the entire trusted-node bitstring having the first length, except for the trusted-node bitstring having the (1-1)-th length.

8. The QKD-based quantum digital signature method of claim 1, wherein the verifying the first message, comprises: receiving an encrypted first message, which is obtained by encrypting the first message and a message-sending-node bitstring having a first length with the shared first secret key, from the message-sending node; extracting a decrypted first message and a decrypted message-sending-node bitstring having the first length by decrypting the received encrypted first message with the shared first secret key; determining whether the received encrypted first message has been sent by a legitimate sending node by comparing the decrypted message-sending-node bitstring having the first length with a trusted-node bitstring having a (1-1)-th length; sending a secondarily-encrypted first message, which is obtained by encrypting the decrypted first message and a trusted-node bitstring having a second length with the shared second secret key, to the message-receiving node, if a determination is made that the received encrypted first message has been sent by a legitimate sending node; and announcing to the message-receiving node that the message-sending node is a legitimate sending node and signatures for the first message are valid, based on a message-receiving-node bitstring having the second length, disclosed by the message-receiving node, and on the decrypted message-sending-node bitstring having the first length.

9. The QKD-based quantum digital signature method of claim 8, wherein the message-receiving-node bitstring having the second length is disclosed on a public board by the message-receiving node after determining, based on a decrypted trusted-node bitstring having the second length and the message-receiving-node bitstring having the second length, whether the secondarily-encrypted first message has been sent by a legitimate sending node.

10. The QKD-based quantum digital signature method of claim 9, wherein the determining whether the secondarily-encrypted first message has been sent by a legitimate sending node, comprises determining that the secondarily-encrypted first message has been sent by a legitimate sending node if a number of mismatching bits between the decrypted trusted-node bitstring having the second length and the message-receiving-node bitstring having the second length is less than a second error rate.

11. The QKD-based quantum digital signature method of claim 8, wherein the determining whether the received encrypted first message has been sent by a legitimate sending node, comprises determining that the received encrypted first message has been sent by a legitimate sending node if a number of mismatching bits between the decrypted message-sending-node bitstring having the first length and the trusted-node bitstring having the (1-1)-th length is less than a first error rate.

12. The QKD-based quantum digital signature method of claim 8, wherein the announcing to the message-receiving node, comprises announcing to the message-receiving node that the message-sending node is a legitimate sending node and the message-sending-node bitstring having the first length and the trusted-node bitstring having the second length are valid, if a number of mismatching bits between the disclosed message-receiving node bitstring having the second length and the decrypted message-sending-node bitstring having the first length is less than a sum of first and second error rates.

13. A quantum key distribution (QKD)-based quantum digital signature method using a trusted node, the QKD-based quantum digital signature method being performed by the trusted node and comprising:
  generating a first trusted-node signature by performing a partial QKD process together with a message-sending node; and
  generating a second trusted-node signature by performing a partial QKD process together with a message-receiving node,
  wherein
  the first trusted-node signature is a trusted-node bitstring having a first length,
  the second trusted-node signature is a trusted-node bitstring having a second length, and
  a difference between the first length and the second length is determined based on a loss rate of a quantum channel between the trusted node and the message-sending node.

14. The QKD-based quantum digital signature method of claim 13, wherein the generating the first trusted-node signature, comprises: generating the first trusted-node signature by extracting a trusted-node bitstring having a (1-1)-th length from a trusted-node bitstring having a first length; and performing quantum encoding for performing a partial QKD together with the message-receiving node, using a trusted-node bitstring having a (1-2)-th length, which is the entire trusted-node bitstring having the first length, except for the trusted-node bitstring having the (1-1)-th length.

15. A quantum key distribution (QKD)-based quantum digital signature method using a trusted node, the QKD-based quantum digital signature method being performed by the trusted node and comprising:
  receiving an encrypted first message, which is obtained by encrypting a first message and a message-sending-node bitstring having a first length with a first secret key, from a message-sending node;
  extracting a decrypted first message and a decrypted message sending-node bitstring having the first length by decrypting the received encrypted first message with the first secret key;
  determining whether the received encrypted first message has been sent by a legitimate sending node by comparing the decrypted message-sending-node bitstring having the first length with a trusted-node bitstring having a (1-1)-th length;
  sending a secondarily-encrypted first message, which is obtained by encrypting the decrypted first message and a trusted-node bitstring having a second length with a second secret key, to a message-receiving node, if a determination is made that the received encrypted first message has been sent by a legitimate sending node; and
  announcing to the message-receiving node that the message-sending node is a legitimate sending node and signatures for the first message are valid, based on a message-receiving-node bitstring having the second length, disclosed by the message-receiving node, and on the decrypted message-sending-node bitstring having the first length,
  wherein
  a difference between the first length and the second length is determined based on a loss rate of a quantum channel between the trusted node and the message-sending node.

16. The QKD-based quantum digital signature method of claim 15, wherein the message-receiving-node bitstring having the second length is disclosed on a public board by the message-receiving node after determining, based on a decrypted trusted-node bitstring having the second length and the message-receiving-node bitstring having the second length, whether the secondarily-encrypted first message has been sent by a legitimate sending node.

17. The QKD-based quantum digital signature method of claim 15, wherein the determining whether the received encrypted first message has been sent by a legitimate sending node, comprises determining that the received encrypted first message has been sent by a legitimate sending node if a number of mismatching bits between a first message-sending-node signature and a first trusted-node signature is less than a first error rate.

18. The QKD-based quantum digital signature method of claim 15, wherein the announcing to the message-receiving node, comprises announcing to the message-receiving node that the first message has been sent by a legitimate sending node if a number of mismatching bits between a first message-receiving-node signature and a second trusted-node signature is less than a second error rate.

19. The QKD-based quantum digital signature method of claim 15, wherein
  the first message is an email or contract,
  the QKD-based quantum digital signature method further comprises completing authentication of an identify of a signer of the first message, if a determination is made that the message-sending node is a legitimate sending node and an announcement is made that the signatures for the first message are valid.

* * * * *